Feb. 26, 1935.  R. E. AUGUSTINE  1,992,345
BOTTLE HOLDER AND LOCK
Filed Jan. 29, 1934
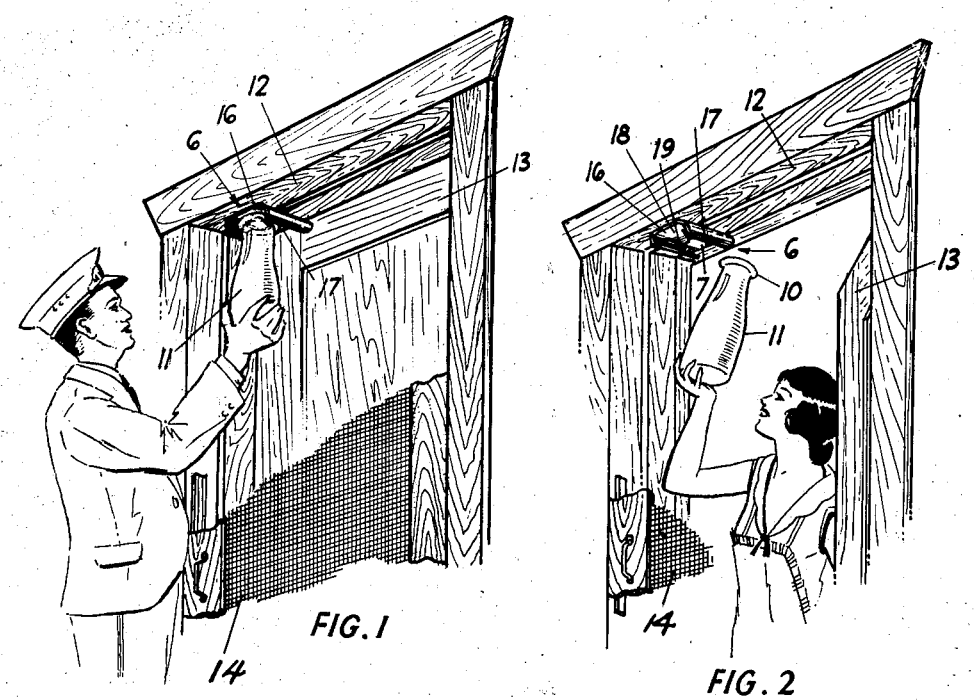
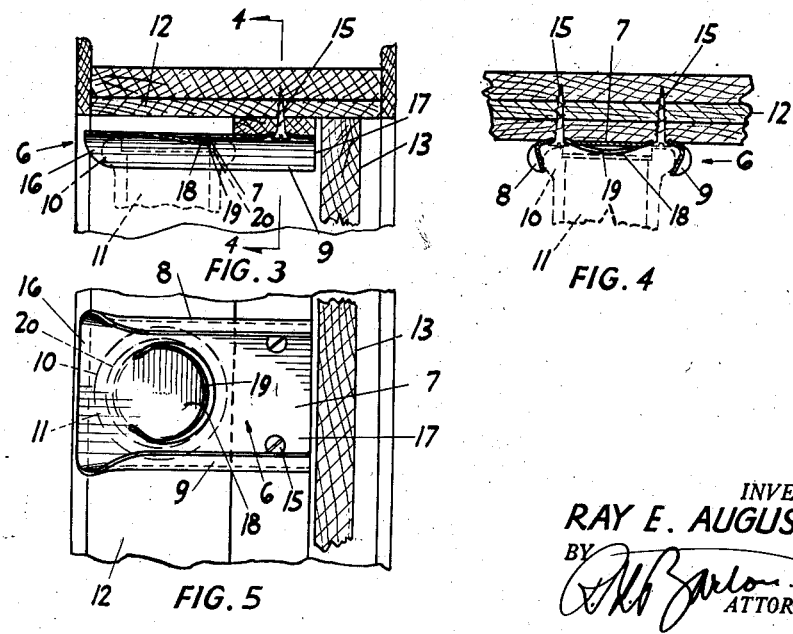
INVENTOR.
RAY E. AUGUSTINE Patented Feb. 26, 1935

1,992,345

UNITED STATES PATENT OFFICE 1,992,345

BOTTLE HOLDER AND LOCK

Ray E. Augustine, Los Angeles, Calif., assignor of one-third to Morris A. Halprin and one-third to Diedrich H. F. C. G. Behr, Los Angeles, Calif.

Application January 29, 1934, Serial No. 708,781

4 Claims. (Cl. 232—42)

My invention relates to improvements in devices for holding and locking milk bottles against withdrawal wherein the holder per se is provided with locking means to obstruct the withdrawal of the bottle in the direction from whence it was inserted, in combination with a door or closure member to temporarily obstruct the withdrawal of the milk bottle from the device until after the closure member has been opened.

It is an object of the invention to provide an article of the above mentioned character whereby milk in bottles once delivered to the consumer will be insured at least of its sanitary condition intermediate the time of its delivery and the time it is placed in the hands of the household.

It is also an object of the invention to provide an improved article whereby a bottle of milk when delivered by a milk man will be placed out of the reach of animals, insects and thieves.

The necessity of keeping milk sanitary in order to preserve health is well known. Milk when delivered by a milk man is usually left on the back stoop where it is not only accessible to thieves but also is within the convenient reach of both animals and insects that carry and breed germs and injurious bacteria. The lives of individuals, especially children thus endangered, may be protected by the proper precautionary efforts.

It is therefore another very important object of the invention to provide an article contributing to the avoidance of these dangers and wherein the device for holding the bottle is placed beyond the reach of dogs and cats and guarded against the approach of thieves and insects.

The objects and purposes of the invention will be better understood after reference is made to the accompanying drawing and to the description and claims are read in the light thereof.

In the drawing,

Fig. 1 is a perspective view incorporating what is now considered a preferred form of the invention and pictorially represents the manner in which the milk man delivers the milk bottle to the customer.

Fig. 2 is a perspective view incorporating the invention and illustrates the manner in which the milk bottle is received by the attendant.

Fig. 3 is a longitudinal section taken thru the device and illustrates its mode of application to a door header.

Fig. 4 is a full section on line 4—4 of Fig. 3.

Fig. 5 is a view looking toward the bottom side of the device shown in Fig. 3.

The article comprising this invention consists of a cast, pressed or other suitable formed channel shape member 6 providing a track and having a substantially flat base or web 7 and depending flanges 8 and 9. The lower edge portions of the flanges 8 and 9 each extend inwardly toward the mid width of the device and are adapted to engage the outer peripheral beaded portion 10 of the mouth of a milk bottle 11 to support it in a suspending manner in such a way so as to cause the top of the bottle to graze or abut said track.

The device is preferably intended to be installed to a door header 12 between a closure member or door 13 and a screen door 14. To accomplish a suitable means for attaching said article to the door header 12 or the like I provide screws 15, said screws being so positioned that they cannot be removed by a screw driver when the bottle 11 is once placed for delivery in the holding article.

The flanges 8 and 9 also provide entrance and exit openings 16 and 17 thru which the mouth end of the bottle must pass at the time the milk man delivers the bottle and when it is received in the hands of the attendant, and to provide for its convenient insertion in the holder I flare the flanges 8 and 9 at the entrance opening 16 to a greater width than those at the exit opening 17.

From the web or base 7, at substantially the mid width of the holder, I strike downwardly a tongue 18, said tongue having a rounded tip 19 to engage the inner peripheral portion 20 of the mouth of the bottle. Said tongue is of a yielding character and is deflectable by the side of the bottle with which it first contacts. When that side of the bottle is sufficiently advanced toward the door 13 the tongue will drop into the mouth of the bottle, with the tip 19 in position to contact with the inner periphery of the mouth portion of the bottle if for any reason an attempt is made to withdraw the bottle in a reverse direction. When the bottle is further advanced toward the door 13 the side of the bottle farthest from the top will in a similar manner deflect the tongue.

From Fig. 4 it will be seen that the resilient tongue 18 is not only rounded at its tip but is also curved transversely. Thus shaped, it not only possesses greater stiffness and strength in proportion to the thickness of the sheet metal used, but its convexed lower surface guards against securing an unauthorized release of the bottle by inserting a knife blade and using the same to pry up the tongue. If this be attempted, the convexity of the tongue tends to cause the knife blade to slip off towards one side or the other without accomplishing the intended result. Viewing the device installed as shown in Fig. 3, it will be seen that, owing to the clearance above the concavo-convex tongue 18, there is plenty of room for said tongue to spring up out of the way as it is deflected by the insertion of the bottle. Said tongue will offer the greatest resistance to the insertion of the bottle just after its base portion begins to be engaged by the front side of the top of the bottle, but at such time the flared and widened mouth portion of the device will remove all side friction from the advancing bottle thus facilitating the insertion thereof.

The screen door 14 cooperates with the inner door 13 to house the suspended bottle thus keeping out flies and other insects.

The manner in which the milk bottle is delivered by the milk man and inserted in the holding device is clearly shown in Fig. 1 and the manner in which the milk bottle is received by the attendant is clearly shown in Fig. 2.

In the interim the inside door temporarily obstructs the delivery of the bottle to any one until said door is opened. The bottle being placed in an elevated position between the two doors, prevents it from being molested by cats, dogs, flies, and the like and thus the sanitary condition of the milk is insured and the purposes of the invention are fully attained.

I claim:

1. A bottle supporting track member having rails to include between them the beaded top portion of a bottle and a transversely curved tongue struck downwardly from said member to obstruct the withdrawal of the bottle in one direction; in combination with a door header to which said track member is attached with a clearance above said transversely curved tongue to permit of its upward deflection during the insertion of the bottle.

2. A device of the class described having, in combination with a track member with rails to receive the beaded top portion of a bottle, a resilient tongue to prevent retraction of the bottle, said tongue having a downwardly directed transversely extending convexity.

3. As an article of manufacture, a bracket comprising a base portion, inwardly directed flanges depending from said base portion, and a transversely convexed tongue struck downwardly from said base portion.

4. The combination, with a door header; of a bottle supporting track member comprising a plate secured to said door header and abutting in a flatwise manner against the under surface thereof, said plate being provided with a pair of depending rails having inwardly directed portions to receive and slidably support between them the expanded top portion of a bottle with the top of such bottle in substantially a sliding contact with the under surface of said plate between said rails, a leaf spring tongue being struck out from said bottle supporting member, said tongue having a free end portion which is located between said rails and is directed toward the inner side of said door header to prevent withdrawal of a bottle after insertion between said rails except in a direction opposite to its insertion, said tongue being convexed transversely to add to the yielding opposition thereof when a bottle is locked thereunder to the inserted position, there being a clearance above the plate from which said tongue is struck out to provide room for the deflection thereof.

RAY E. AUGUSTINE.